(12) United States Patent
Lu et al.

(10) Patent No.: US 11,854,237 B2
(45) Date of Patent: Dec. 26, 2023

(54) HUMAN BODY IDENTIFICATION METHOD, ELECTRONIC DEVICE AND STORAGE MEDIUM

(71) Applicant: Beijing Baidu Netcom Science and Technology Co., LTD, Beijing (CN)

(72) Inventors: Zipeng Lu, Beijing (CN); Jian Wang, Beijing (CN); Yuchen Yuan, Beijing (CN); Hao Sun, Beijing (CN); Errui Ding, Beijing (CN)

(73) Assignee: Beijing Baidu Netcom Science and Technology Co., LTD, Beijing (CN)

( * ) Notice: Subject to any disclaimer, the term of this patent is extended or adjusted under 35 U.S.C. 154(b) by 270 days.

(21) Appl. No.: 17/353,324

(22) Filed: Jun. 21, 2021

(65) Prior Publication Data

US 2021/0312172 A1 Oct. 7, 2021

(30) Foreign Application Priority Data

Dec. 11, 2020 (CN) .......................... 202011448336.6

(51) Int. Cl.
*G06V 10/25* (2022.01)
*G06V 40/10* (2022.01)
(Continued)

(52) U.S. Cl.
CPC ............ *G06V 10/25* (2022.01); *G06F 18/214* (2023.01); *G06V 10/757* (2022.01);
(Continued)

(58) Field of Classification Search
CPC ........ G06V 10/25; G06V 40/10; G06V 10/82; G06V 40/103; G06V 10/757; G06V 10/774; G06V 10/764; G06F 18/214
See application file for complete search history.

(56) References Cited

U.S. PATENT DOCUMENTS

| 2009/0087033 A1* | 4/2009 | Chao ...................... G06V 40/10 382/110 |
| 2017/0308771 A1* | 10/2017 | Shimauchi ............. G06V 20/49 |
| 2021/0073516 A1* | 3/2021 | Luo ........................ G06V 10/82 |

FOREIGN PATENT DOCUMENTS

| CN | 106797498 A | 5/2017 |
| CN | 110046600 A | 7/2019 |

(Continued)

OTHER PUBLICATIONS

Dec. 8, 2021—(EP) EESR—App. No. 21178991.2.
(Continued)

*Primary Examiner* — Pinalben Patel
(74) *Attorney, Agent, or Firm* — Banner & Witcoff, Ltd.

(57) ABSTRACT

A human body identification method, an electronic device and a storage medium, related to the technical field of artificial intelligence such as computer vision and deep learning, are provided. The method includes: inputting an image to be identified into a human body detection model, to obtain a plurality of preselected detection boxes; identifying a plurality of key points from each of the preselected detection boxes respectively according to a human body key point detection model, and obtaining a key point score of each of the key points; determining a target detection box from each of the preselected detection boxes, according to a number of the key points whose key point scores meet a key point threshold; and inputting the target detection box into a human body key point classification model, to obtain a human body identification result for the image to be identified.

15 Claims, 9 Drawing Sheets

(51) Int. Cl.
*G06F 18/214* (2023.01)
*G06V 10/75* (2022.01)
*G06V 10/764* (2022.01)
*G06V 10/774* (2022.01)
*G06V 10/82* (2022.01)

(52) U.S. Cl.
CPC .......... *G06V 10/764* (2022.01); *G06V 10/774* (2022.01); *G06V 10/82* (2022.01); *G06V 40/10* (2022.01); *G06V 40/103* (2022.01)

(56) References Cited

FOREIGN PATENT DOCUMENTS

| | | | | | |
|---|---|---|---|---|---|
| CN | 111062239 | A | | 4/2020 | |
| CN | 111327828 | A | | 6/2020 | |
| CN | 111523468 | A | | 8/2020 | |
| CN | 111598091 | A | | 8/2020 | |
| CN | 111639602 | A | * | 9/2020 | ......... G06K 9/00248 |
| CN | 111881908 | A | | 11/2020 | |
| CN | 112115827 | A | * | 12/2020 | ........... A61B 5/1117 |
| EP | 3800613 | A1 | * | 4/2021 | ......... G06K 9/00268 |

OTHER PUBLICATIONS

Hao-Shu Fang et al., "RMPE: Regional Multi-person Pose Estimation", 2017 IEEE International Conference on Computer Vision (CCV), IEEE, Oct. 22, 2017, pp. 2353-2362.
Jian Wang et al., "Graph-PCNN: Two State Human Pose Estimation with Graph Rose Refinement", 16th European Conference, Glasgow, UK, ISSN, Jul. 21, 2020, vol. 12356, pp. 492-508.
Zhaowei Cai et al., "Cascade R-CNN: Delving Into High Quality Object Detection", 2018 IEEE/CVF Conference on Computer Vision and Pattern Recognition, IEEE, Jun. 18, 2018, pp. 6154-6162.
Jul. 31, 2023—(CN) First Office Action—App. No. CN202011448336.6.
Jian Wang et al., Graph-PCNN Two Stage Human Pose Estimation with Graph Pose Refinement, ECCV 2020, LNCS 12356, pp. 492-508, https://doi.org/10.1007/978-3-030-58621-8_29.
Gong Fa, Research on Human Action Recognition Based on Spacetime Double-branch Network, Computer Technology and Development, vol. 30, No. 9, Sep. 2020.
Hao-Shu Fang et al., RMPE: Regional Multi-person Pose Estimation, 2017 IEEE International Conference on Computer Vision, DOI 10.1109/ICCV 2017.256, downloaded on Oct. 16, 2023.
Zhaowei Cai et al., Cascade R-CNN: Delving into High Quality Object Detection, Computer Vision Foundation, available on IEEE Xplore, Jun. 2018.
Zhao Wenqing, et al., Object Detection Based on Improved Non-Maximum Suppression Algorithm, Journal of Image and Graphics, www.cjig.cn, ies, 2018 ,23(11): 1676-1685.

* cited by examiner

HUMAN BODY IDENTIFICATION METHOD, ELECTRONIC DEVICE AND STORAGE MEDIUM

CROSS-REFERENCE TO RELATED APPLICATION

This application claims priority to Chinese patent application No. 202011448336.6, filed on Dec. 11, 2020, which is hereby incorporated by reference in its entirety.

TECHNICAL FIELD

The present disclosure relates to the technical field of artificial intelligence, in particular to the fields of computer vision and deep learning.

BACKGROUND

Human body identification is widely applied to various scenes, such as various security monitoring scenes. In the prior art, a human body detection model is trained mainly based on a human body detection box and a pedestrian detection set, for human body identification.

SUMMARY

The present disclosure provides a human body identification method and apparatus, a device and a storage medium.

According to a first aspect of the present disclosure, there is provided a human body identification method, including:
inputting an image to be identified into a human body detection model, to obtain a plurality of preselected detection boxes;
identifying a plurality of key points from each of the preselected detection boxes respectively according to a human body key point detection model, and obtaining a key point score of each of the key points;
determining a target detection box from each of the preselected detection boxes, according to a number of the key points whose key point scores meet a key point threshold; and
inputting the target detection box into a human body key point classification model, to obtain a human body identification result for the image to be identified.

According to a second aspect of the present disclosure, there is provided a method for generating a human body key point classification model, including:
acquiring a positive sample image, wherein the positive sample image corresponds to at least one human body labeling box including a key point label;
generating a negative sample image based on the positive sample image;
inputting the negative sample image into a human body key point detection model, to obtain a negative sample labeling box; and
training a machine learning model according to the human body labeling box and the negative sample labeling box, to generate a human body key point classification model, wherein the human body key point classification model is used for the human body identification method of any one of claims 1 to 6.

According to a third aspect of the present disclosure, there is provided a human body identification apparatus, including:
a preselected detection box determination module configured for inputting an image to be identified into a human body detection model, to obtain a plurality of preselected detection boxes;
a key point detection module configured for identifying a plurality of key points from each of the preselected detection boxes respectively according to a human body key point detection model, and obtaining a key point score of each of the key points;
a target detection box determination module configured for determining a target detection box from each of the preselected detection boxes, according to a number of the key points whose key point scores meet a key point threshold; and
a human body identification result determination module configured for inputting the target detection box into a human body key point classification model, to obtain a human body identification result for the image to be identified.

According to a fourth aspect of the present disclosure, there is provided an apparatus for generating a human body key point classification model, including:
a positive sample image acquisition module configured for acquiring a positive sample image, wherein the positive sample image corresponds to at least one human body labeling box including a key point label;
a negative sample image generation module configured for generating a negative sample image based on the positive sample image;
a negative sample labeling box determination module configured for inputting the negative sample image into a human body key point detection model, to obtain a negative sample labeling box; and
a training module configured for training a machine learning model according to the human body labeling box and the negative sample labeling box, to generate a human body key point classification model, wherein the human body key point classification model is used for the human body identification apparatus of any one of claims 9 to 14.

According to a fifth aspect of the present disclosure, there is provided an electronic device, including:
at least one processor; and
a memory communicatively connected to the at least one processor; wherein,
the memory stores instructions executable by the at least one processor, the instructions being executed by the at least one processor to enable the at least one processor to perform the method provided by any embodiment herein.

According to a sixth aspect of the present disclosure, there is provided a non-transitory computer-readable storage medium storing computer instructions for enabling a computer to perform the method provided by any embodiment of the present disclosure.

According to a seventh aspect of the present disclosure, there is provided a computer program product including computer programs which, when executed by a processor, implement the method provided by any embodiment of the present disclosure.

It should be understood that the content described in this section is neither intended to limit the key or important features of the embodiments of the present disclosure, nor intended to limit the scope of the present disclosure. Other features of the present disclosure will be readily understood through the following description.

BRIEF DESCRIPTION OF THE DRAWINGS

The drawings are used to better understand the scheme and do not constitute a limitation to the present disclosure. In which.

DETAILED DESCRIPTION

Exemplary embodiments of the present disclosure are described below in combination with the drawings, including various details of the embodiments of the present disclosure to facilitate understanding, which should be considered as exemplary only. Thus, those of ordinary skill in the art should realize that various changes and modifications can be made to the embodiments described here without departing from the scope and spirit of the present disclosure. Likewise, descriptions of well-known functions and structures are omitted in the following description for clarity and conciseness.

Figure 1:
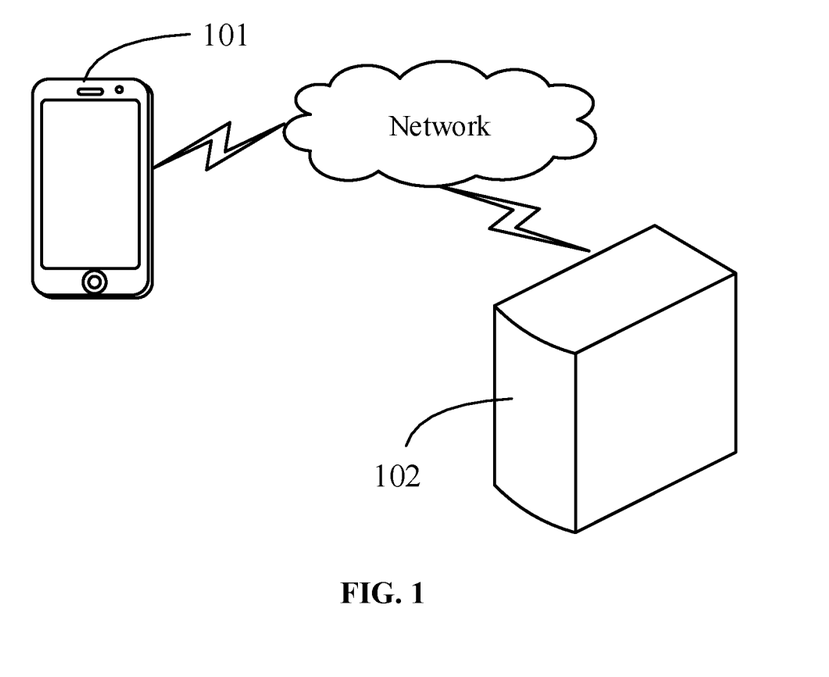
FIG. 1 is a schematic diagram of an application scenario according to an embodiment of the present disclosure.

FIG. 1 is a schematic diagram of an application scenario according to an embodiment of the present disclosure. As shown in FIG. 1, a terminal device 101 may be a hardware such as a mobile phone, a tablet, a vehicle-mounted terminal, a portable computer or a desktop computer, etc. having a display screen. In a case where the terminal device 101 is a software, it may be installed in the above-described electronic device. A server 102 may provide various services, such as support for applications installed on the terminal device 101. The method provided by the embodiment of the present disclosure may be executed by the server 102 or by the terminal device 101, and the corresponding apparatus corresponding to the method may be arranged in the terminal device 101 or in the server 102. Among other things, any number of terminal devices, networks and servers may be configured for implementation needs.

In one example, an image to be identified may be input into the terminal device 101, and the human body identification method in the embodiment of the present disclosure is executed by the terminal device 101, to obtain a human body identification result; it may also be sent by the terminal device 101 to the server 102, and the human body identification method in the embodiment of the present disclosure is executed by the server 102, to obtain a human body identification result.

Figure 2:
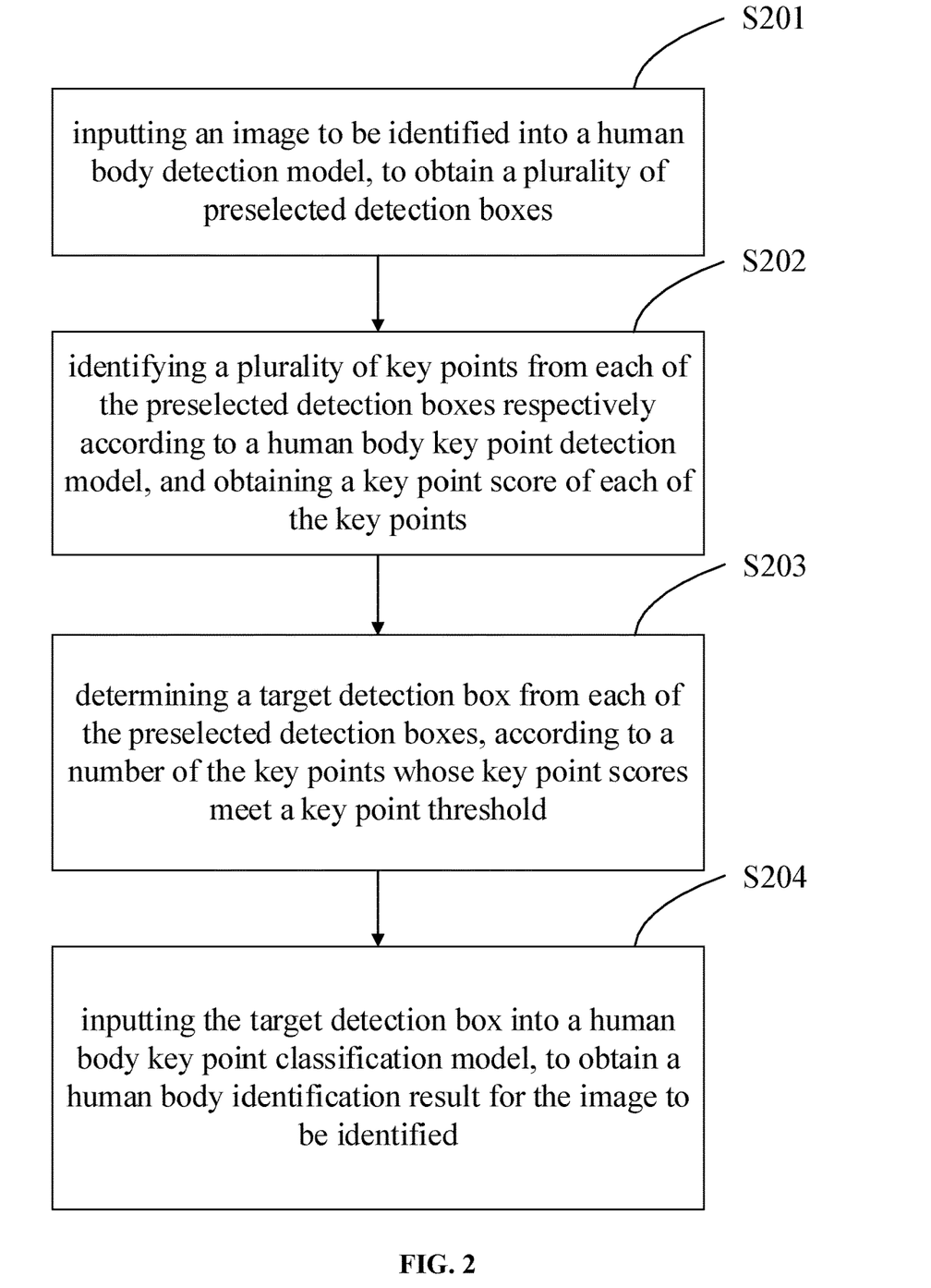
FIG. 2 is a flowchart of a human body identification method according to an embodiment of the present disclosure.

FIG. 2 illustrates a human body identification method according to an embodiment of the present disclosure, as shown in FIG. 2, the method may include:

S201, inputting an image to be identified into a human body detection model, to obtain a plurality of preselected detection boxes;

S202, identifying a plurality of key points from each of the preselected detection boxes respectively according to a human body key point detection model, and obtaining a key point score of each of the key points;

S203, determining a target detection box from each of the preselected detection boxes, according to a number of the key points whose key point scores meet a key point threshold; and S204, inputting the target detection box into a human body key point classification model, to obtain a human body identification result for the image to be identified.

According to the technical scheme of the embodiment of the present disclosure, the topological information of the key points of the human body can be fully utilized, and the identification accuracy rate and the recall rate are improved.

Illustratively, the human body detection model may employ a yolov3 model, and is obtained by training based on a coco human body detection set.

Illustratively, the human body key point detection model may employ resnet50 as a backbone, and is obtained by training based on a coco key point dataset. The human body key point detection model may output human body posture key points such as 17 key points of a head, a neck, a left shoulder, a left elbow, a left wrist, a right shoulder, a right elbow, a right wrist, a left hip, a left knee, a left foot, a right hip, a right knee and a right foot for an image input to the human body key point detection model.

Illustratively, the human body key point classification model may employ a graph convolutional network (GCN), and is obtained by training based on a coco key point training set. The human body key point classification model may output a human body identification result for a detection box which is input to the human body key point classification model and contains key point information.

According to the method provided by the embodiment of the present disclosure, inputting an image to be identified into a human body detection model may obtain a plurality of preselected detection boxes; and then an original image feature is extracted from the image to be identified based on the size and the position of the preselected detection box, and the extracted original image feature is inputted into a human body key point detection model, to identify a plurality of key points and a key point score of each key point.

Herein, the "score" may be understood as a confidence level. For example, a key point score may be understood as the confidence that the identified key point is a human body key point.

Further, a target detection box is determined from each preselected detection box according to the number of the key points in the preselected detection box whose key point scores meet a key point threshold; and the target detection box is input into a human body key point classification model, to obtain a human body identification result for the image to be identified.

Herein, the human body identification results are divided into two types: an identification result of the human body, i.e. the image portion corresponding to the target detection box is a human body image area (which can be named as a third human body image area in the embodiment of the present disclosure); and none identification result of the human body, i.e. the image portion corresponding to the target detection box is not a human body image area. Illustratively, according to the size and position of the target detection box, an image taken from an image to be identified is an image portion corresponding to the target detection box.

According to the human body identification method of the embodiment of the present disclosure, subsidiarily judging human body identification based on human body posture key points (human body key points) may fully utilize topological information of the human body key points, to improve identification accuracy and recall rate. Further, a target detection box is screened out based on a number of the key points whose key point scores meet a key point threshold, and the target detection box is identified according to a human body key point classification model, to obtain a human body identification result, so that the identification accuracy can be further improved.

In one embodiment, S201 may include: inputting the image to be identified into the human body detection model, to obtain a plurality of initial detection boxes and a detection box score Sbbox of each of the initial detection boxes; and determining a corresponding initial detection box as the preselected detection box, in a case where the detection box score Sbbox is greater than or equal to a low detection box threshold Lbs and less than or equal to a high detection box threshold Hbs.

That is, after the image to be identified is input into the human body detection model, a plurality of initial detection boxes and a detection box score Sbbox of each initial detection box can be obtained. The detection box score Sbbox may be understood as: a confidence degree that the image portion taken from the image to be identified according to the size and the position of the initial detection box is a human body image area (human body elements are contained in the image area).

Further, the low detection box threshold Lbs and the high detection box threshold Hbs are set, illustratively, the low detection box threshold is set as Lbs≤0.1; and the high detection box threshold is set as Hbs≥0.95.

Figure 3:
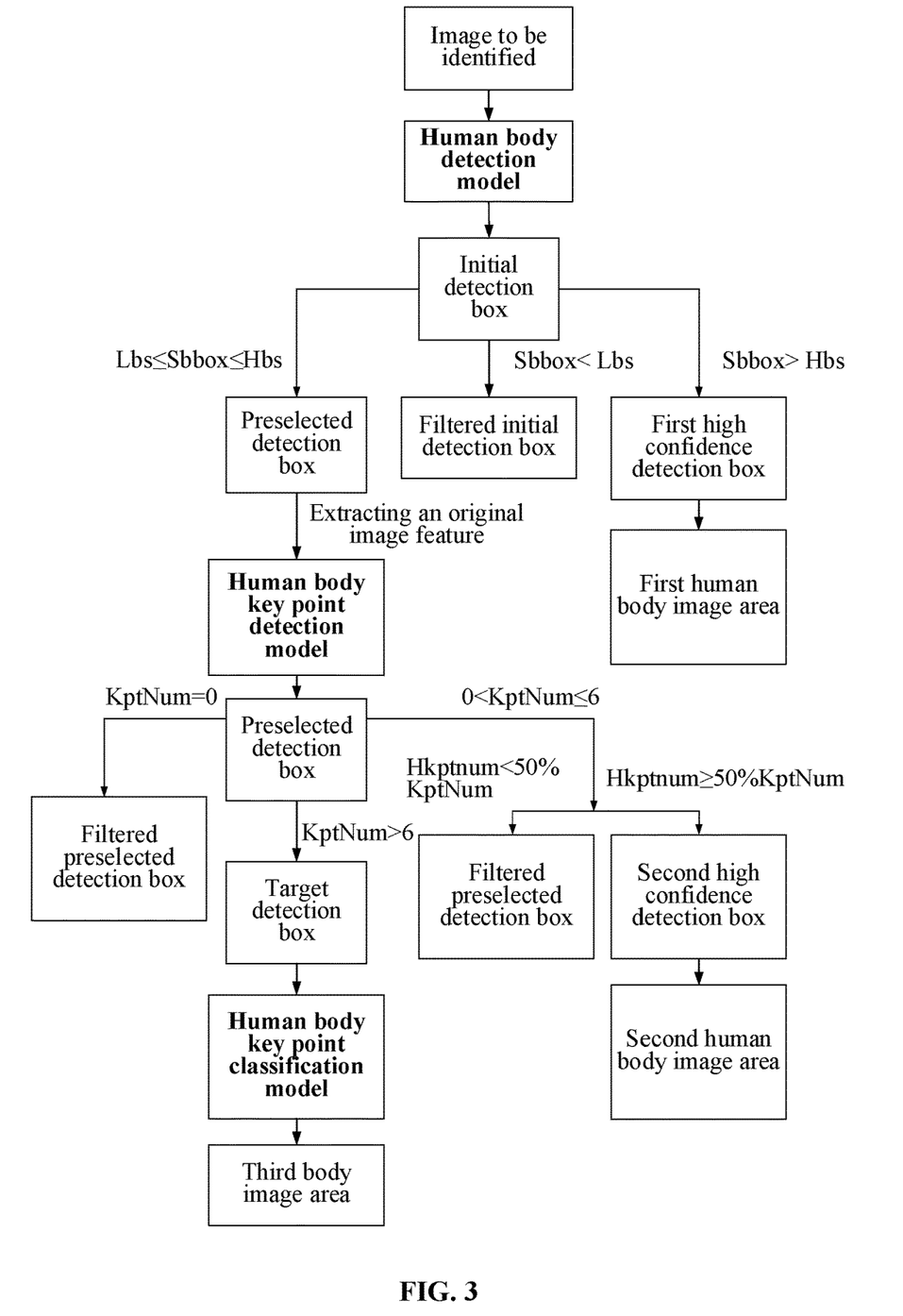
FIG. 3 is an application example diagram of a human body identification method according to an embodiment of the present disclosure.

In one example, as shown in FIG. 3, there are three cases according to the relationship among the detection box score Sbbox and the low detection box threshold Lbs and the high detection box threshold Hbs:

(1) in a case where Sbbox<Lbs, a corresponding initial detection box is filtered out, namely, the corresponding initial detection box represents a low confidence detection result or false detection;

(2) in a case where Lbs≤Sbbox≤Hbs, a corresponding initial detection box is considered as a preselected detection box, to enter S202;

(3) in a case where Sbbox>Hbs, a corresponding initial detection box is determined to be a first high confidence detection box, and the image portion extracted (taken) from the image to be identified according to the size and position of the first high confidence detection box is considered as a human body image area (i.e. a first human body image area).

That is, the first human body image area represents a human body identification result that is a human body; and the image portion corresponding to the filtered initial detection box represents a human body identification result which is not a human body.

Based on this, preliminary human body identification for the image to be identified can be completed. On the one hand, part of the initial detection box may be filtered off, and a first human body image area is obtained, only part of the initial detection box (the preselected detection box) is sent to the next detection link, simplifying the subsequent detection calculation amount; on the other hand, a preliminary human body identification result including the first human body image area may be obtained, to avoid a human body image with a high confidence from being missed.

In one embodiment, the key point threshold may include a low key point threshold Lks. S203 may include: determining a corresponding preselected detection box as the target detection box, in a case where a first key point number KptNum is larger than a preset number; wherein the first key point number KptNum is a number of the key points whose key point scores are larger than a low key point threshold Lks.

Illustratively, the preset number may be 6, but other values are possible, which is not limited in the embodiments of the present disclosure.

For each preselected detection box, the number of the key points whose key point scores in the preselected detection box are larger than a low key point threshold Lks is counted, to obtain the first key point number KptNum. Furthermore, according to the relationship between the first key point number KptNum and the preset number, there may be three cases:

(2.1) in a case where KptNum=0, a corresponding preselected detection box is filtered out, to represent that human body limb information does not exist in the preselected detection box;

(2.2) in a case where KptNum>the preset number 6, a corresponding preselected detection box is determined as a target detection box, to enter S204;

(2.3) in a case where 0<KptNum≤the preset number 6, a determination flow of the second human body image area is performed.

In one embodiment, the key point threshold may include a high key point threshold Hks, and the above determination flow of the second human body image area may include: in a case where the second key point number Hkptnum is larger than or equal to a preset proportion of the first key point number KptNum, determining the corresponding preselected detection box as a second high confidence detection box; wherein the second key point number Hkptnum is a number of the key points whose key point scores are larger than the high key point threshold Hks; and extracting a second human body image area from the image to be identified, according to a size and a position of the second high confidence detection box.

Illustratively, the preset proportion may be 50%; and the high key point threshold may be set as Hks≥0.8.

According to the relationship between the second key point number Hkptnum and the preset proportion of the first key point number KptNum, there may be two cases:

(2.3.1) in a case where Hkptnum<50% KptNum, a corresponding preselected detection box is filtered out, to represent that the preselected detection box is a low confidence detection box;

(2.3.2) in a case where Hkptnum≥50% KptNum, a corresponding preselected detection box is determined to be a second high confidence detection box, and the image portion extracted (taken) from the image to be identified according to the size and position of the second high confidence detection box is considered as a human body image area (i.e. a second human body image area).

That is, the second human body image area represents a human body identification result that is a human body; and the image portion corresponding to the filtered preselected detection box represents a human body identification result which is not a human body.

Based on this, further human body identification for the image to be identified can be completed. On the one hand, part of the preselected detection box may be filtered off, and a second human body image area is obtained, only part of the preselected detection box (the target detection box) is sent to the next detection link, simplifying the subsequent detection calculation amount; on the other hand, a further human body identification result including the second human body image area may be obtained, to avoid a human body image with a high confidence from being missed.

In one embodiment, the method of the embodiment of the present disclosure may further include: performing key-point-based non maximum suppression (NMS) processing on each of the target detection boxes; and inputting the target detection box after the NMS processing into the human body key point classification model, to obtain the human body identification result.

In a case where two human bodies are very close together, an intersection-over-union (IoU) between the corresponding detection boxes is also large, and in a case where NMS processing is performed based on an IoU distance between the detection boxes, the close detection box, although representing the human body side box, is also subjected to the NMS.

In addition, the embodiment of the present disclosure performs NMS processing based on the key points, to avoid that case. Because the IoU distance between the detection boxes corresponding to two adjacent closer human bodies is large, but the gestures of two people are often different or the key point positions of the key parts are different, the two human body detection boxes can be distinguished by performing the NMS processing on the key point positions of respective parts of the human bodies corresponding to the two detection boxes, so that the identification accuracy and the recall rate are further improved.

Illustratively, NMS processing may be performed on a high confidence detection box (including a first high confidence detection box and a second high confidence detection box) based on the IoU distance between the detection boxes; and key-point-based NMS processing is performed on the preselected detection box and the target detection box.

An exemplary flow of key-point-based NMS processing for a detection box (a pre-detection box or a target detection box) is described below:

sorting is performed from large to small according to the detection box scores, and a detection box with the highest score is directly reserved as a set S; a key point similarity Kptiou is calculated from the remaining respective detection boxes and the detection box in the S set; a threshold kptth is set, in a case where Kptiou<Kptth, it indicates that the gestures of two detection boxes are similar, the detection box is removed, otherwise, the detection box is reserved in the S set; and the above steps are repeated circularly until all the detection boxes are traversed. The remaining detection boxes are all detection boxes corresponding to one human body one by one.

The calculation formula of the key point similarity Kptiou is as follows:

$$\sum_{k=1}^{k=17}\left((x_1^k - x_2^k)^2 + (y_1^k - y_2^k)^2\right)$$

wherein k is a key point number; $(x_1^k, y_1^k)$ indicates the position of the k-th key point of the first detection box; and $(x_2^k, y_2^k)$ indicates the position of the k-th key point of the second detection box.

Figure 4:
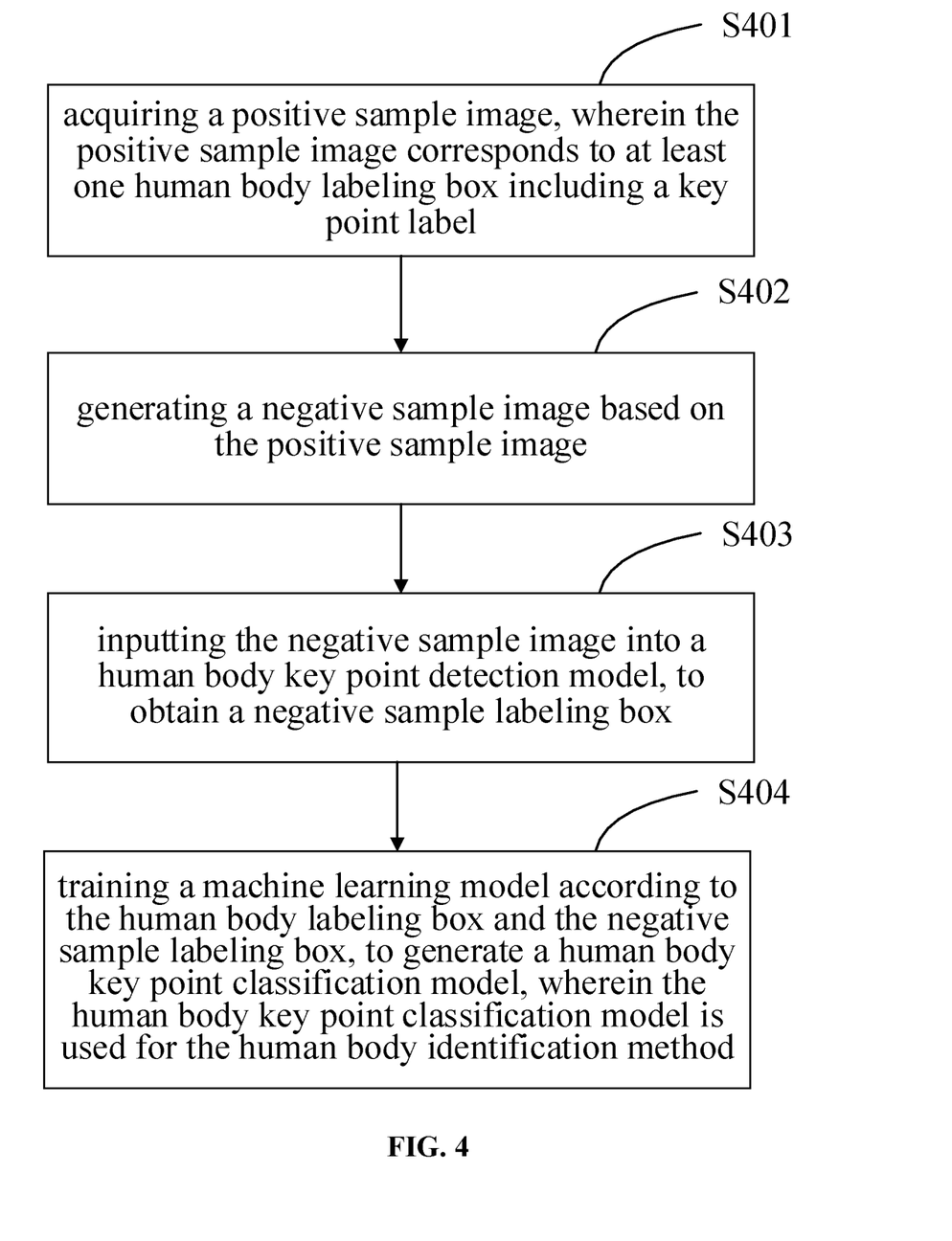
FIG. 4 is a flowchart of a method for generating a human body key point classification model according to an embodiment of the present disclosure.

FIG. 4 shows a flowchart of a method for generating a human body key point classification model according to an embodiment of the present disclosure. As shown in FIG. 4, the method includes:

S401, acquiring a positive sample image, wherein the positive sample image corresponds to at least one human body labeling box including a key point label;

S402, generating a negative sample image based on the positive sample image;

S403, inputting the negative sample image into a human body key point detection model, to obtain a negative sample labeling box; and S404, training a machine learning model according to the human body labeling box and the negative sample labeling box, to generate a human body key point classification model, wherein the human body key point classification model is used for the human body identification method.

Illustratively, a positive sample may employ a coco key point training set. A large number of positive sample images are included in the coco key point training set, each positive sample image corresponds to one or more human body labeling boxes, respectively, and key point labels are also included in the human body labeling box. The positive sample image may also be acquired or labeled on its own, without limitation herein.

Further, some negative sample images may be generated according to the positive sample images, namely, image portions which do not contain human body elements may be taken from the positive sample images, to serve as negative sample images; the negative sample image is input into a human body key point detection model, to obtain a negative sample labeling box; and a human body key point classification model may be obtained by training a machine learning model based on the human body labeling box and the negative sample labeling box.

Illustratively, the machine learning model may be a GCN network. A GCN network input is represented by (N, C, T, M), N represents the training number of a training batch, C is the number of features, and the features in the present disclosure have 2D key point features (x, y, score) which share three-dimensional features, thus C=3; v is the number of key points, M is the number of people, here a single person, M=1.

In one embodiment, S402 may include: generating a sample detection box randomly on the positive sample image; and taking a negative sample human body image from the positive sample image according to a size and a position of the sample detection box, in a case where a distance between the sample detection box and the respective human body labeling boxes is smaller than a preset distance.

Illustratively, the sample detection box negbox may be randomly generated on a coco training set. IoU distances between the sample detection box negbox and all human body labeling boxes are calculated. In a case where each IoU distance is smaller than a preset distance (such as 0.1), the sample detection box negbox is reserved as a negative sample for training the GCN network; otherwise, a sample negbox meeting a condition is generated continuously circularly and randomly. For a sample detection box negbox which meets the condition and may be considered as a negative sample, according to the size and the position of the sample detection box negbox, an image portion taken from a corresponding image is considered as a negative sample human body image.

The human body key point classification model may take 17 limb key points as an input, and judge, according to the topological information of the human body key points, whether the topological structure is a human body, to improve the identification accuracy.

Figure 5:
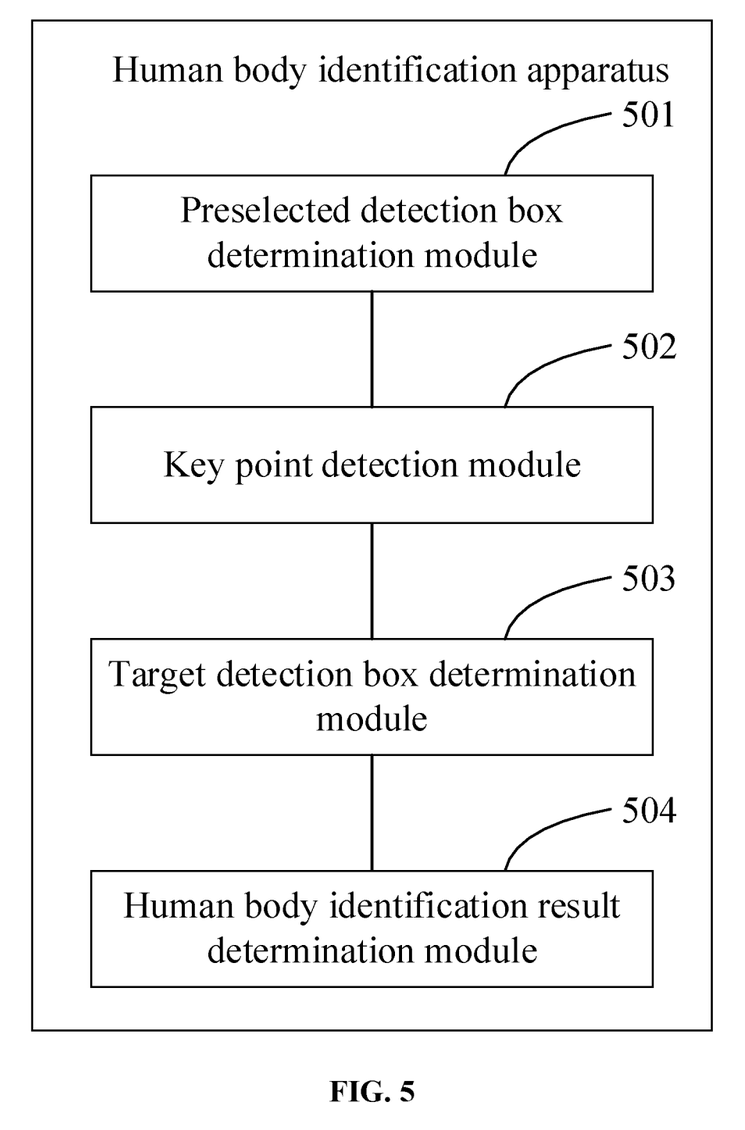
FIG. 5 is a block diagram of a human body identification apparatus according to an embodiment of the present disclosure.

FIG. 5 shows a block diagram of a human body identification apparatus according to an embodiment of the present disclosure. As shown in FIG. 5, the apparatus may include:
- a preselected detection box determination module 501 configured for inputting an image to be identified into a human body detection model, to obtain a plurality of preselected detection boxes;
- a key point detection module 502 configured for identifying a plurality of key points from each of the preselected detection boxes respectively according to a human body key point detection model, and obtaining a key point score of each of the key points;
- a target detection box determination module 503 configured for determining a target detection box from each of the preselected detection boxes, according to a number of the key points whose key point scores meet a key point threshold; and
- a human body identification result determination module 504 configured for inputting the target detection box into a human body key point classification model, to obtain a human body identification result for the image to be identified.

Figure 6:
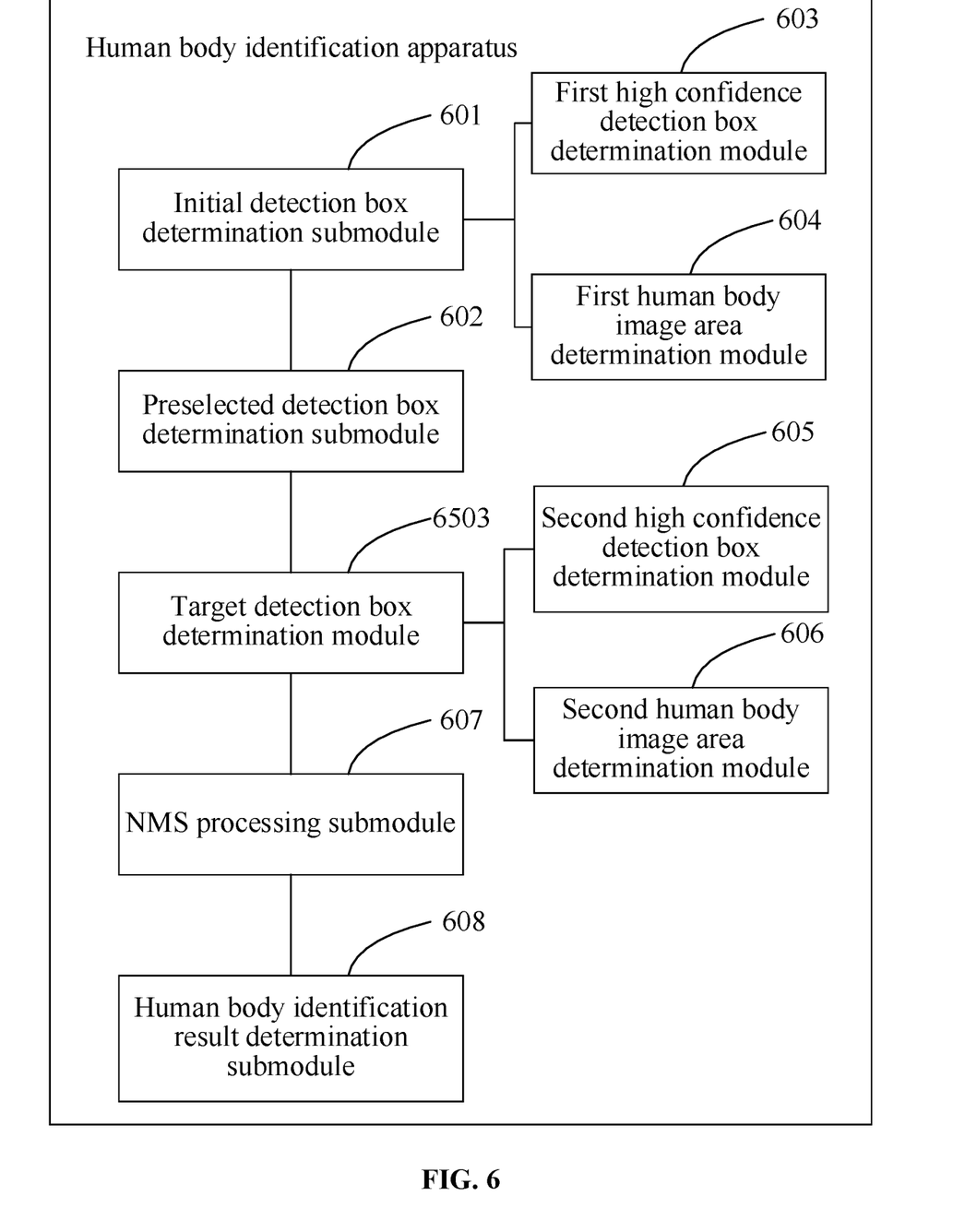
FIG. 6 is a block diagram of a human body identification apparatus according to another embodiment of the present disclosure.

In one embodiment, as shown in FIG. 6, the preselected detection box determination module 501 may include:
- an initial detection box determination submodule 601 configured for inputting the image to be identified into the human body detection model, to obtain a plurality of initial detection boxes and a detection box score of each of the initial detection boxes; and
- a preselected detection box determination submodule 602 configured for determining a corresponding initial detection box as the preselected detection box, in a case where the detection box score is greater than or equal to a low detection box threshold and less than or equal to a high detection box threshold.

In one embodiment, as shown in FIG. 6, the apparatus may further include:
- a first high confidence detection box determination module 603 configured for determining the corresponding initial detection box as a first high confidence detection box, in a case where the detection box score is greater than the high detection box threshold; and
- a first human body image area determination module 604 configured for extracting a first human body image area from the image to be identified, according to a size and a position of the first high confidence detection box.

In one embodiment, the key point threshold may include a low key point threshold, and a target detection box determination module 6503 shown in FIG. 6 may further be configured for:
- determining a corresponding preselected detection box as the target detection box, in a case where a first key point number is larger than a preset number;
- wherein, the first key point number is a number of the key points whose key point scores are larger than a low key point threshold.

The target detection box determination module 6503 shown in FIG. 6 is a module same as or similar to the target detection box determination module 503 shown in FIG. 5.

In one embodiment, as shown in FIG. 6, the apparatus may further include:
- a second high confidence detection box determination module 605 configured for determining the corresponding preselected detection box as a second high confidence detection box, in a case where the first key point number is greater than zero and less than or equal to the preset number, and the second key point number is greater than or equal to a preset proportion of the first key point number; wherein the second key point number is a number of the key points whose key point scores are larger than the high key point threshold; and
- a second human body image area determination module 606 configured for extracting a second human body image area from the image to be identified, according to a size and a position of the second high confidence detection box.

In one embodiment, the target detection box may include a plurality of target detection boxes, as shown in FIG. 6, the human body identification result determination module 504 may include:
- an NMS processing submodule 607 configured for performing key-point-based non maximum suppression (NMS) processing on each of the target detection boxes; and
- a human body identification result determination submodule 608 configured for inputting the target detection box after the NMS processing into the human body key point classification model, to obtain the human body identification result.

Figure 7:
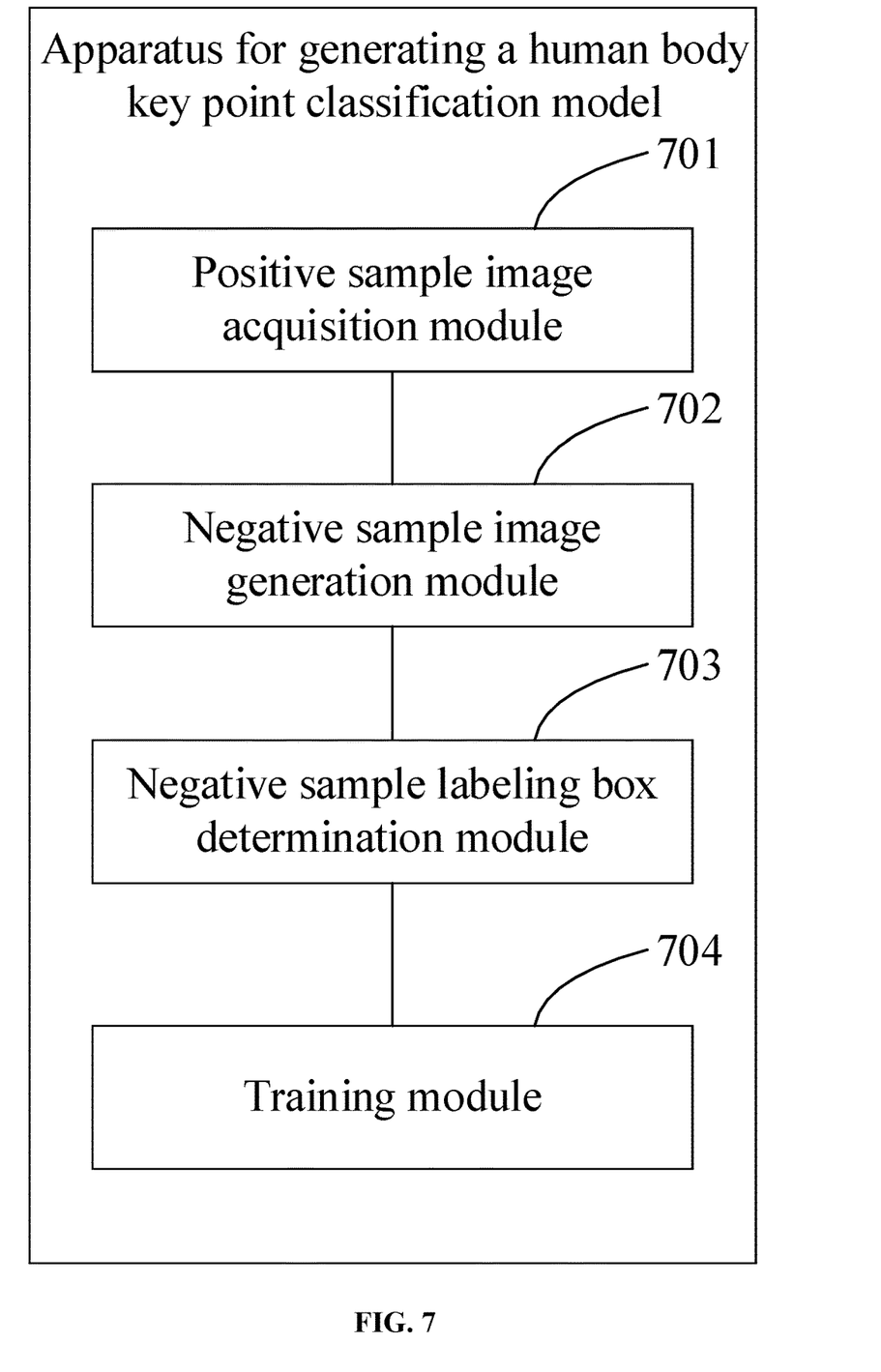
FIG. 7 is a block diagram of an apparatus for generating a human body key point classification model according to an embodiment of the present disclosure.

FIG. 7 shows a block diagram of an apparatus for generating a human body key point classification model according to an embodiment of the present disclosure. As shown in FIG. 7, the apparatus may include:
- a positive sample image acquisition module 701 configured for acquiring a positive sample image, wherein the positive sample image corresponds to at least one human body labeling box including a key point label;
- a negative sample image generation module 702 configured for generating a negative sample image based on the positive sample image;
- a negative sample labeling box determination module 703 configured for inputting the negative sample image into a human body key point detection model, to obtain a negative sample labeling box; and
- a training module 704 configured for training a machine learning model according to the human body labeling box and the negative sample labeling box, to generate a human body key point classification model, wherein the human body key point classification model is used for the human body identification apparatus.

Figure 8:
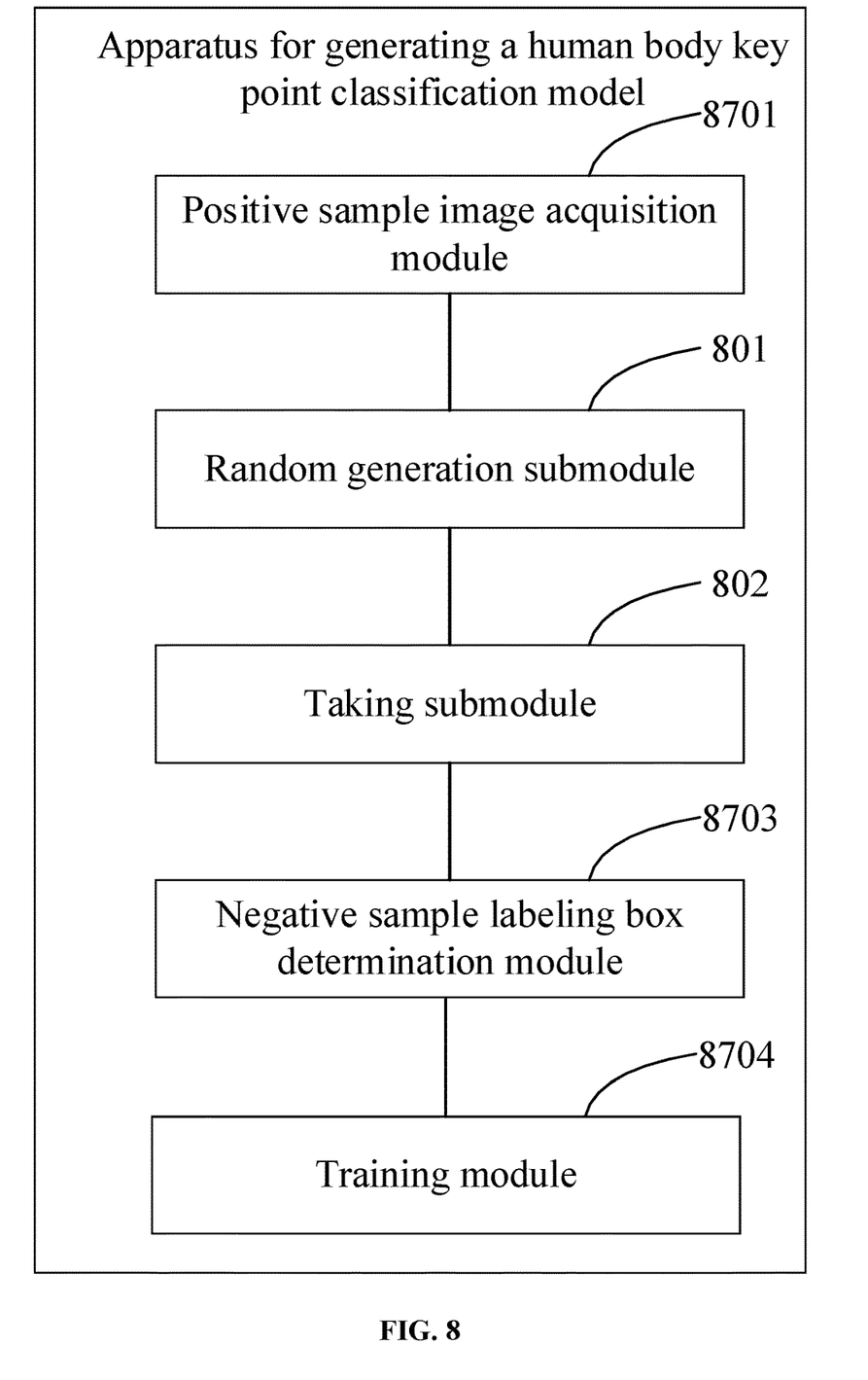
FIG. 8 is a block diagram of an apparatus for generating a human body key point classification model according to another embodiment of the present disclosure.

In one embodiment, as shown in FIG. 8, the negative sample image generation module 702 may include:

a random generation submodule 801 configured for generating a sample detection box randomly on the positive sample image; and a taking submodule 802 configured for taking a negative sample human body image from the positive sample image according to a size and a position of the sample detection box, in a case where a distance between the sample detection box and the respective human body labeling boxes is smaller than a preset distance.

The positive sample image acquisition module 8701, the negative sample labeling box determination module 8703 and the training module 8704 shown in FIG. 8 are modules same as or similar to the positive sample image acquisition module 701, the negative sample labeling box determination module 703 and the training module 704 shown in FIG. 7, respectively.

The function of each module in each apparatus of the embodiment of the present disclosure may be referred to the corresponding descriptions in the above-mentioned method, and will not be described in detail herein.

According to embodiments of the present disclosure, the present disclosure also provides an electronic device, a readable storage medium and a computer program product.

Figure 9:
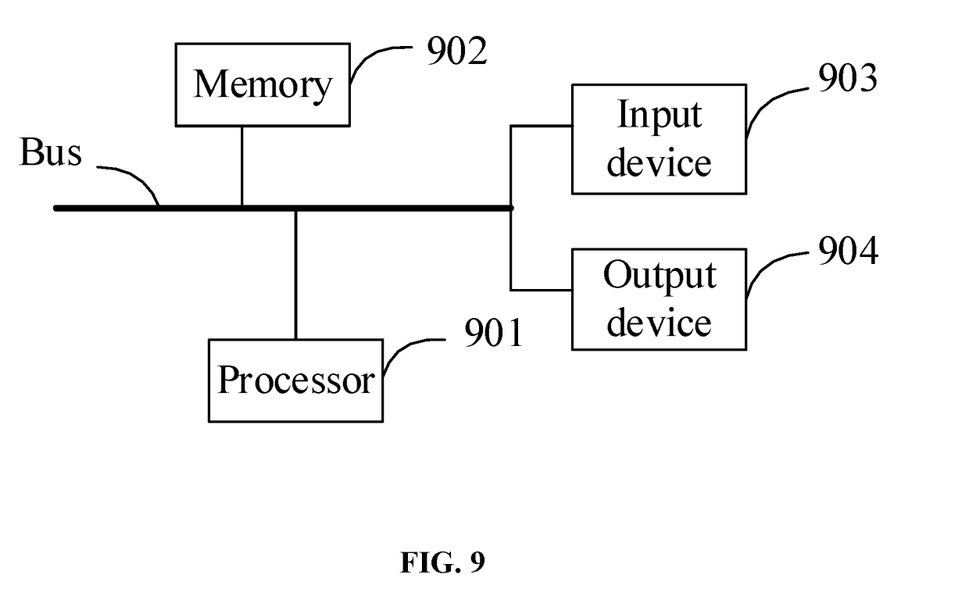
FIG. 9 is a block diagram of an electronic device used to implement the embodiments of the present disclosure.

FIG. 9 is a block diagram of an electronic device for implementing the generation method or the evaluation method of the embodiment of the present disclosure. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as a personal digital assistant, a cellular telephone, a smart phone, a wearable device, and other similar computing devices. The components shown herein, their connections and relationships, and their functions are by way of example only and are not intended to limit the implementations of the present disclosure described and/or claimed herein.

As shown in FIG. 9, the electronic device may include one or more processors 901, a memory 902, and interfaces for connecting components, including high-speed interfaces and low-speed interfaces. The respective components are interconnected by different buses and may be mounted on a common main-board or otherwise as desired. The processor may process instructions executed within the electronic device, including instructions stored in or on the memory to display graphical information of a graphical user interface (GUI) on an external input/output device, such as a display device coupled to the interface. In other implementations, a plurality of processors and/or buses may be used with a plurality of memories, if necessary. Also, a plurality of electronic devices may be connected, each providing some of the necessary operations (e.g., as an array of servers, a set of blade servers, or a multiprocessor system). An example of a processor 901 is shown in FIG. 9.

The memory 902 is a non-transitory computer-readable storage medium provided herein. The memory stores instructions executable by at least one processor to cause the at least one processor to execute the generation method or the estimation method provided herein. The non-transitory computer-readable storage medium of the present disclosure stores computer instructions for enabling a computer to execute the generation method or the estimation method provided herein.

The memory 902, as a non-transitory computer-readable storage medium, may be configured to store non-transitory software programs, non-transitory computer executable programs and modules, such as program instructions/modules corresponding to the generation method or the estimation method in the embodiment of the present disclosure. The processor 901 executes various functional applications and data processing of the server by running the non-transitory software programs, instructions and modules stored in the memory 902, that is, implements the generation method or the estimation method in the above method embodiment.

The memory 902 may include a program storage area and a data storage area, wherein the program storage area may store an operating system, and an application program required for at least one function; and the data storage area may store data created according to the use of the electronic device for implementing the generation method or the estimation method. In addition, the memory 902 may include a high speed random access memory, and may also include a non-transitory memory, such as at least one disk storage device, a flash memory device, or other non-transitory solid state storage devices. In some embodiments, the memory 902 may optionally include memories remotely located with respect to the processor 901, and these remote memories may be connected, via a network, to the electronic device for implementing the generation method or the estimation method. Examples of such networks may include, but are not limited to, the Internet, an intranet, a local area network, a mobile communication network and combinations thereof.

The electronic device for implementing the generation method or the estimation method may further include an input device 903 and an output device 904. The processor 901, the memory 902, the input device 903, and the output device 904 may be connected by a bus or in other ways, and the bus connection is taken as an example in FIG. 9.

The input device 903 may receive input digital or character information, and generate a key signal input related to a user setting and a functional control of electronic device for implementing the generation method or the estimation method. For example, the input device may be a touch screen, a keypad, a mouse, a track pad, a touch pad, a pointer stick, one or more mouse buttons, a track ball, a joystick, and other input devices. The output device 904 may include a display device, an auxiliary lighting device (e.g., a light emitting diode (LED)), a tactile feedback device (e.g., a vibrating motor), etc. The display device may include, but is not limited to, a liquid crystal display (LCD), an LED display, and a plasma display. In some embodiments, the display device may be a touch screen.

Various implementations of the systems and techniques described herein may be implemented in a digital electronic circuit system, an integrated circuit system, an application specific integrated circuit (ASIC), a computer hardware, a firmware, a software, and/or a combination thereof. These various implementations may include an implementation in one or more computer programs, which can be executed and/or interpreted on a programmable system including at least one programmable processor; the programmable processor may be a dedicated or general-purpose programmable processor and capable of receiving and transmitting data and instructions from and to a storage system, at least one input device, and at least one output device.

These computing programs (also referred to as programs, software, software applications, or codes) may include machine instructions of a programmable processor, and may be implemented using high-level procedural and/or object-oriented programming languages, and/or assembly/machine languages. As used herein, the terms "machine-readable medium" and "computer-readable medium" may refer to any computer program product, apparatus, and/or device (e.g., a magnetic disk, an optical disk, a memory, a programmable logic device (PLD)) for providing machine instructions and/or data to a programmable processor, including a machine-readable medium that receives machine instructions as machine-readable signals. The term "machine-readable signal" may refer to any signal used to provide machine instructions and/or data to a programmable processor.

In order to provide an interaction with a user, the system and technology described here may be implemented on a computer having: a display device (e. g., a cathode ray tube (CRT) or a liquid crystal display (LCD) monitor) for displaying information to the user; and a keyboard and a pointing device (e. g., a mouse or a trackball), through which the user can provide an input to the computer. Other kinds of devices can also provide an interaction with the user. For example, a feedback provided to the user may be any form of sensory feedback (e.g., visual feedback, auditory feedback, or tactile feedback); and an input from the user may be received in any form, including an acoustic input, a voice input or a tactile input.

The systems and techniques described herein may be implemented in a computing system (e.g., as a data server) that may include a background component, or a computing system (e.g., an application server) that may include a middleware component, or a computing system (e.g., a user computer having a graphical user interface or a web browser through which a user may interact with embodiments of the systems and techniques described herein) that may include a front-end component, or a computing system that may include any combination of such background components, middleware components, or front-end components. The components of the system may be connected to each other through a digital data communication in any form or medium (e.g., a communication network). Examples of the communication network may include a local area network (LAN), a wide area network (WAN), and the Internet.

The computer system may include a client and a server. The client and the server are typically remote from each other and typically interact via the communication network. The relationship of the client and the server is generated by computer programs running on respective computers and having a client-server relationship with each other. The server may be a cloud server, also called as a cloud computing server or a cloud host, which is a host product in a cloud computing service system, to solve the defects of difficult management and weak business expansibility in the services of the traditional physical host and the virtual private server (VPS). The server may also be a server of a distributed system, or a server incorporating a blockchain.

It should be understood that the steps can be reordered, added or deleted using the various flows illustrated above. For example, the steps described in the present disclosure may be performed concurrently, sequentially or in a different order, so long as the desired results of the technical solutions disclosed in the present disclosure can be achieved, and there is no limitation herein.

The above-described specific embodiments do not limit the scope of the present disclosure. It will be apparent to those skilled in the art that various modifications, combinations, sub-combinations and substitutions are possible, depending on design requirements and other factors. Any modifications, equivalent substitutions, and improvements within the spirit and principles of the present disclosure are intended to be included within the scope of the present disclosure.

What is claimed is:

1. A human body identification method, comprising:
inputting an image to be identified into a human body detection model, to obtain a plurality of preselected detection boxes;
identifying a plurality of key points from each of the preselected detection boxes respectively according to a human body key point detection model, and obtaining a key point score of each of the key points;
determining a target detection box from each of the preselected detection boxes, according to a number of the key points whose key point scores meet a key point threshold; and
inputting the target detection box into a human body key point classification model, to obtain a human body identification result for the image to be identified,
wherein the key point threshold comprises a low keypoint threshold, and the determining the target detection box from each of the preselected detection boxes, according to the number of the key points whose key point scores meet the key point threshold, comprises:
determining a corresponding preselected detection box as the target detection box, in a case where a first key point number is larger than a preset number, wherein the first key point number is a number of the key points whose key point scores are larger than a low key point threshold,
wherein the key point threshold further comprises a high key point threshold, and the method further comprises:
determining the corresponding preselected detection box as a second high confidence detection box, in a case where the first key point number is greater than zero and less than or equal to the preset number, and a second key point number is greater than or equal to a preset proportion of the first key point number, wherein the second key point number is a number of the key points whose key point scores are lager than the high key point threshold; and
extracting a second human body image area from the image to be identified, according to a size and a position of the second high confidence detection box.

2. The method of claim 1, wherein the inputting the image to be identified into the human body detection model, to obtain the plurality of preselected detection boxes, comprises:
inputting the image to be identified into the human body detection model, to obtain a plurality of initial detection boxes and a detection box score of each of the initial detection boxes; and
determining a corresponding initial detection box as the preselected detection box, in a case where the detection box score is greater than or equal to a low detection box threshold and less than or equal to a high detection box threshold.

3. The method of claim 2, further comprising:
determining the corresponding initial detection box as a first high confidence detection box, in a case where the detection box score is greater than the high detection box threshold; and
extracting a first human body image area from the image to be identified, according to a size and a position of the first high confidence detection box.

4. The method of claim 1, wherein the target detection box comprises a plurality of target detection boxes, and the inputting the target detection box into the human body key point classification model, to obtain the human body identification result for the image to be identified, comprises:

performing key-point-based non maximum suppression (NMS) processing on each of the target detection boxes; and inputting the target detection box after the NMS processing into the human body key point classification model, to obtain the human body identification result.

5. A method for generating a human body key point classification model, comprising:

acquiring a positive sample image, wherein the positive sample image corresponds to at least one human body labeling box comprising a key point label;

generating a negative sample image based on the positive sample image;

inputting the negative sample image into a human body key point detection model, to obtain a negative sample labeling box; and training a machine learning model according to the human body labeling box and the negative sample labeling box, to generate a human body key point classification model, wherein the human body key point classification model is used for the human body identification method of claim 1.

6. The method of claim 5, wherein the generating the negative sample image based on the positive sample image, comprises:

generating a sample detection box randomly on the positive sample image; and taking a negative sample human body image from the positive sample image according to a size and a position of the sample detection box, in a case where a distance between the sample detection box and the respective human body labeling boxes is smaller than a preset distance.

7. An electronic device, comprising:

at least one processor; and a memory communicatively connected to the at least one processor, wherein the memory stores instructions executable by the at least one processor, the instructions being executed by the at least one processor to enable the at least one processor to perform operations of:

inputting an image to be identified into a human body detection model, to obtain a plurality of preselected detection boxes;

identifying a plurality of key points from each of the preselected detection boxes respectively according to a human body key point detection model, and obtaining a key point score of each of the key points;

determining a target detection box from each of the preselected detection boxes, according to a number of the key points whose key point scores meet a key point threshold; and inputting the target detection box into a human body key point classification model, to obtain a human body identification result for the image to be identified, wherein the key point threshold comprises a low key point threshold, and the determining the tarot detection box from each of the preselected detection boxes, according to the number of the key points whose key point scores meet the key point threshold, comprises:

determining a corresponding preselected detection box as the target detection box, in a case where a first key point number is larger than a preset number, wherein the first key point number is a number of the key points whose key point scores are larger than a low key point threshold, wherein the key point threshold further comprises a high key point threshold, and the instructions are executable by the at least one processor to enable the at least one processor to further perform operations of:

determining the corresponding preselected detection box as a second high confidence detection box, in a case where the first key point number is greater than zero and less than or equal to the preset number, and a second key point number is greater than or equal to a preset proportion of the first key point number, wherein the second key point number is a number of the key points whose key point scores are larger than the high key point threshold; and extracting a second human body image area from the image to be identified, according to a size and a position of the second high confidence detection box.

8. The electronic device of claim 7, wherein the inputting the image to be identified into the human body detection model, to obtain the plurality of preselected detection boxes, comprises:

inputting the image to be identified into the human body detection model, to obtain a plurality of initial detection boxes and a detection box score of each of the initial detection boxes; and determining a corresponding initial detection box as the preselected detection box, in a case where the detection box score is greater than or equal to a low detection box threshold and less than or equal to a high detection box threshold.

9. The electronic device of claim 8, wherein the instructions are executable by the at least one processor to enable the at least one processor to further perform operations of:

determining the corresponding initial detection box as a first high confidence detection box, in a case where the detection box score is greater than the high detection box threshold; and extracting a first human body image area from the image to be identified, according to a size and a position of the first high confidence detection box.

10. The electronic device of claim 7, wherein the target detection box comprises a plurality of target detection boxes, and the inputting the target detection box into the human body key point classification model, to obtain the human body identification result for the image to be identified, comprises:

performing key-point-based non maximum suppression (NMS) processing on each of the target detection boxes; and inputting the target detection box after the NMS processing into the human body key point classification model, to obtain the human body identification result.

11. An electronic device, comprising:

at least one processor; and a memory communicatively connected to the at least one processor, wherein the memory stores instructions executable by the at least one processor, the instructions being executed by the at least one processor to enable the at least one processor to perform operations of:

acquiring a positive sample image, wherein the positive sample image corresponds to at least one human body labeling box comprising a key point label;

generating a negative sample image based on the positive sample image;

inputting the negative sample image into a human body key point detection model, to obtain a negative sample labeling box; and training a machine learning model according to the human body labeling box and the negative sample labeling box, to generate a human body key point classification model, wherein the human body key point classification model is used for the electronic device of claim 7.

12. The electronic device of claim 11, wherein the generating the negative sample image based on the positive sample image, comprises:

generating a sample detection box randomly on the positive sample image; and taking a negative sample human body image from the positive sample image according to a size and a position of the sample detection box, in a case where a distance between the sample detection box and the respective human body labeling boxes is smaller than a preset distance.

13. A non-transitory computer-readable storage medium storing computer instructions for enabling a computer to perform operations of:

inputting an image to be identified into a human body detection model, to obtain a plurality of preselected detection boxes;

identifying a plurality of key points from each of the preselected detection boxes respectively according to a human body key point detection model, and obtaining a key point score of each of the key points;

determining a target detection box from each of the preselected detection boxes, according to a number of the key points whose key point scores meet a key point threshold; and inputting the target detection box into a human body key point classification model, to obtain a human body identification result for the image to be identified, wherein the key point threshold comprises a low key point threshold, and the determining the target detection box from each of the preselected detection boxes, according to the number of the key points whose key point scores meet the key point threshold, comprises:

determining a corresponding, preselected detection box as the target detection box, in a case where a first key point number is larger than a preset number, wherein the first key point number is a number of the key points whose key point scores are larger than a low key point threshold, wherein the key point threshold further comprises a high key point threshold, and the computer instructions are executable by the computer to enable the computer to further perform operations of:

determining the corresponding preselected detection box as a second high confidence detection box, in a case where the first key point number is greater than zero and less than or equal to the preset number, and a second key point number is greater than or equal to a preset proportion of the first key point number wherein the second key point number is a number of the key points whose key point scores are larger than the high key point threshold; and extracting a second human body image area from the image to be identified, according to a size and a position of the second high confidence detection box.

14. The non-transitory computer-readable storage medium of claim 13, wherein the inputting the image to be identified into the human body detection model, to obtain the plurality of preselected detection boxes, comprises:

inputting the image to be identified into the human body detection model, to obtain a plurality of initial detection boxes and a detection box score of each of the initial detection boxes; and determining a corresponding initial detection box as the preselected detection box, in a case where the detection box score is greater than or equal to a low detection box threshold and less than or equal to a high detection box threshold.

15. The non-transitory computer-readable storage medium of claim 14, wherein the computer instructions are executable by the computer to enable the computer to further perform operations of:

determining the corresponding initial detection box as a first high confidence detection box, in a case where the detection box score is greater than the high detection box threshold; and extracting a first human body image area from the image to be identified, according to a size and a position of the first high confidence detection box.

* * * * *